Nov. 16, 1965     J. PICKLES     3,217,827
VEHICLE SPEED CONTROL SYSTEM
Filed April 16, 1962     3 Sheets-Sheet 1

Fig.1

INVENTOR.
JOSEPH PICKLES
BY Whittemore
Hulbert & Belknap
ATTORNEYS.

Nov. 16, 1965  J. PICKLES  3,217,827
VEHICLE SPEED CONTROL SYSTEM
Filed April 16, 1962  3 Sheets-Sheet 2
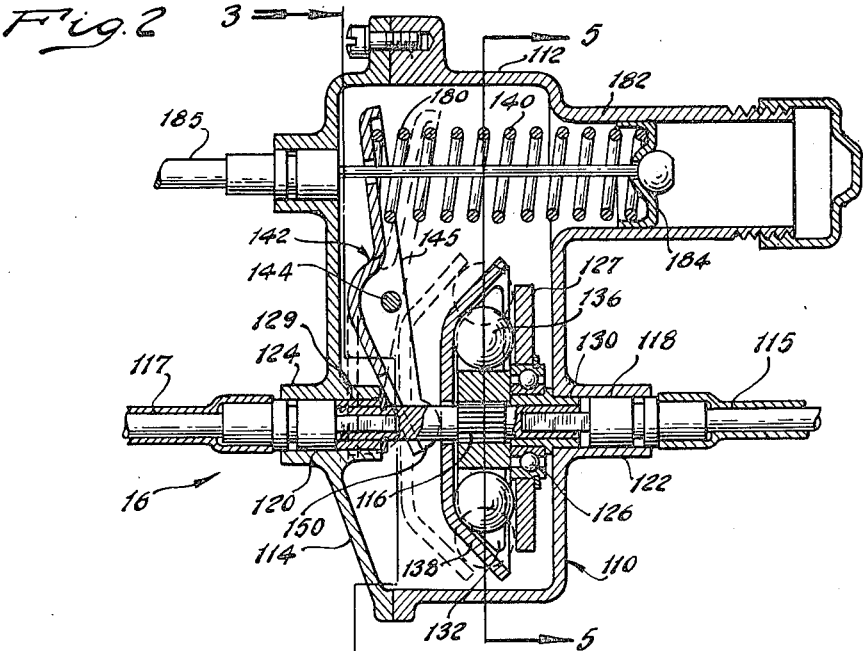
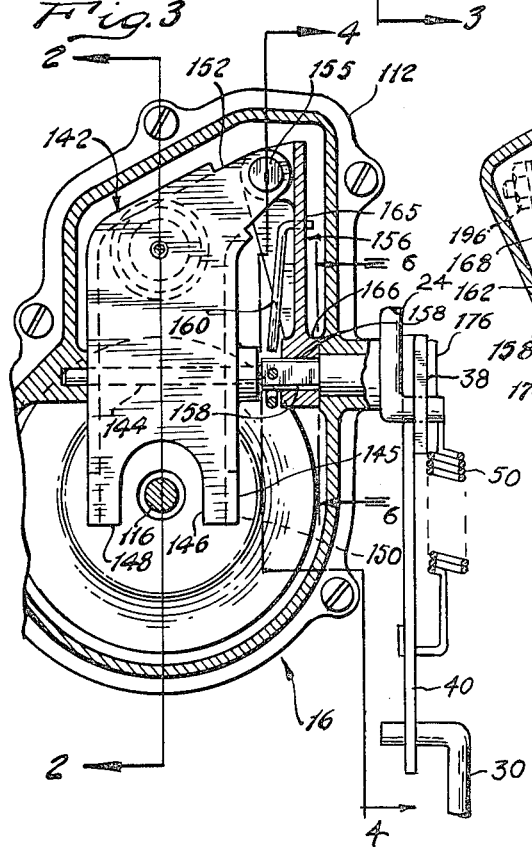
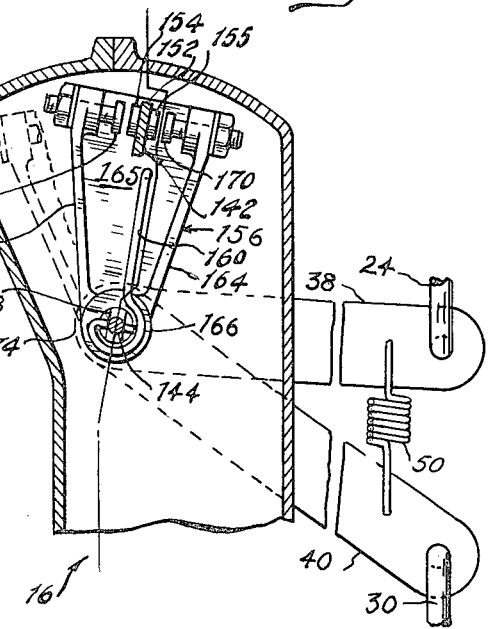
INVENTOR.
JOSEPH PICKLES
BY Whittemore
Hulbert & Belknap
ATTORNEYS

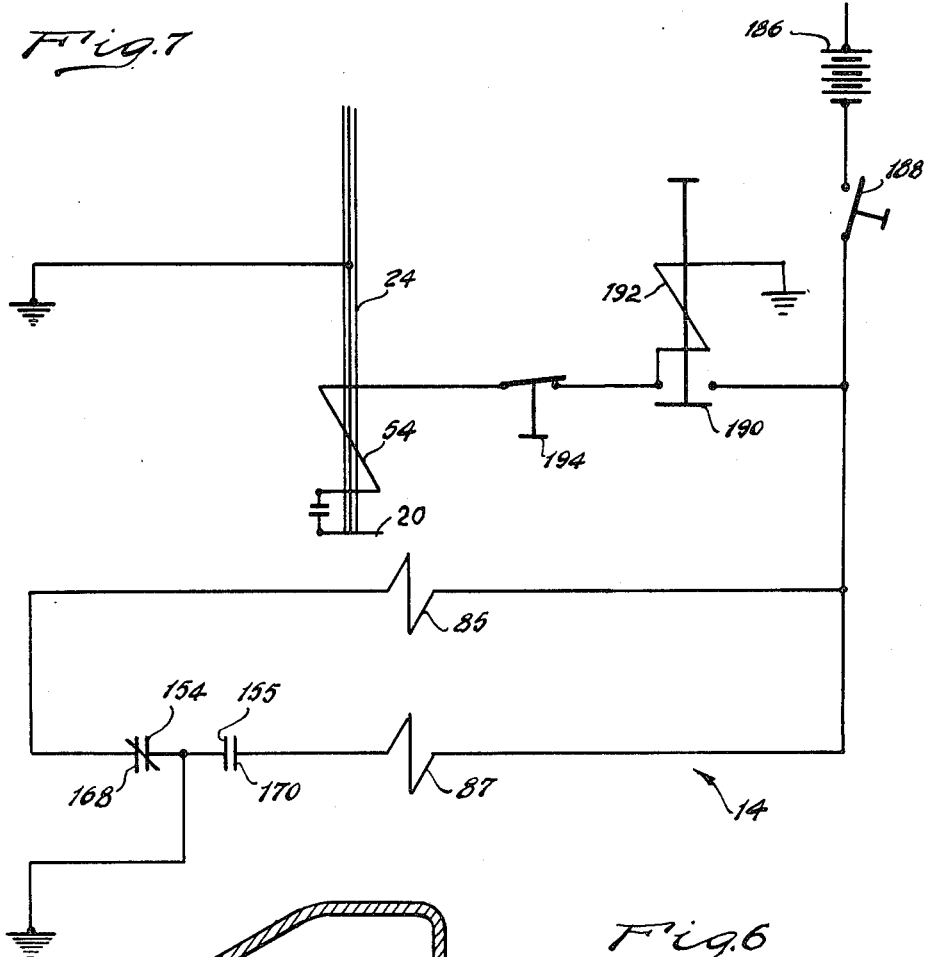
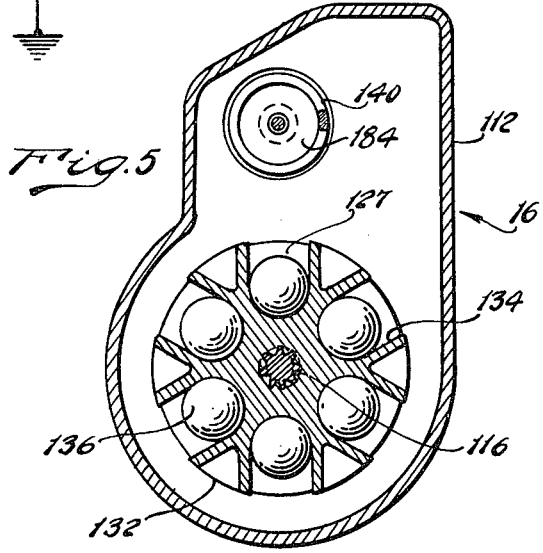
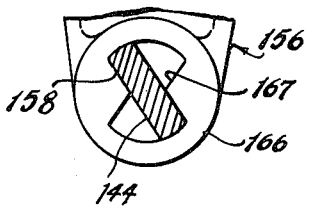

United States Patent Office 3,217,827
Patented Nov. 16, 1965

3,217,827
VEHICLE SPEED CONTROL SYSTEM
Joseph Pickles, Dearborn, Mich., assignor to Ferro Manufacturing Corporation, a corporation of Michigan
Filed Apr. 16, 1962, Ser. No. 187,671
19 Claims. (Cl. 180—82.1)

This application is a continuation-in-part of copending application, Serial No. 96,770, filed March 20, 1961.

The invention relates to speed control systems and refers more specifically to a governor for an automobile or similar device operable to indicate that the device is operating at or above a predetermined speed and to prevent the speed of the device from exceeding said predetermined speed or to maintain the speed of the device between limits at the predetermined speed and including override mechanism to permit exceeding of the predetermined speed.

In the past governors have often lacked desired versatility. In particular prior automobile governors have often lacked means for indicating that the automobile is being operated at or above a predetermined speed, for preventing the automobile from exceeding a predetermined governed speed, for holding the automobile at a predetermined speed or override means whereby at the option of an operator the speed of the automobile could be increased beyond the predetermined speed. Also governors have often not included means for selectively initiating operation of the governor and for easily adjusting the predetermined speed.

In addition wherein such versatility in governors has been provided in the past the governors have usually been complicated whereby their reliability is poor and their expense prohibits their use by the general public.

Therefore it is one of the purposes of the present invention to provide an improved speed control system for an automobile or similar device operable on being energized to maintain the automobile between predetermined speed limits.

Another object is to provide an improved speed limiting control for an automobile or similar device operable to prevent the speed of the automobile from exceeding a predetermined speed.

Another object is to provide a speed control system for an automobile or similar device as set forth above operable to indicate when the device is being operated at or above a predetermined speed when the system is not energized.

Another object is to provide a speed control system as set forth above and including mechanism permitting overriding of the system to increase the speed of the automobile above the predetermined speed.

Another object is to provide a governor for automobiles or similar devices including vacuum throttle operating means, electric actuating means for the vacuum throttle operating means and mechanical speed sensing means for controlling the energizing of the electric actuating means in accordance with the speed of the device.

Another object is to provide a governor as set forth above wherein the vacuum throttle operating means comprises a spring biased cylinder, an armature and armature rod mounted for reciprocation in said cylinder and movable axially to position a throttle valve, and a vacuum chamber having a movable diaphragm therein, one end of said cylinders being connected to the diaphragm for movement therewith in opposition to the spring bias applied to the cylinder.

Another object is to provide governing apparatus as set forth above wherein the mechanical speed sensing means comprises a shaft rotatable at a speed proportional to the speed of the device it is desired to govern, a lever, centrifugal means for positioning the lever in accordance with the speed of rotation of the shaft, and means associated with the lever including a contact member for completing circuits through the electric actuating means in accordance with the relative position of said lever and contact member.

Another object is to provide governing apparatus as set forth above wherein the electric actuating means includes a pair of alternatively energizable solenoid valves for the vacuum throttle operating means.

Another object is to provide governing apparatus as set forth above wherein the electric actuating means includes a solenoid energizable to lock the armature of the vacuum throttle operating means in a fixed position relative to the cylinder thereof.

Another object is to provide governing apparatus as set forth above wherein resilient means and a lost motion connection are provided between the lever and contact member whereby an indication of operation of the vehicle at or above a predetermined speed is provided.

Another object is to provide governing apparatus as set forth above which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is a partially diagrammatic, partially schematic representation of governing apparatus in accordance with the invention.

FIGURE 2 is a section of the mechanical speed sense portion of the governing apparatus illustrated in FIGURE 1 showing the speed sense elements in the position therebefore governing action occurs in full lines and indicating their position at governing speed in broken lines.

FIGURE 3 is a cross sectional view of the speed sense illustrated in FIGURE 2 taken substantially on the line 3—3 in FIGURE 2.

FIGURE 4 is a section view of the speed sense illustrated in FIGURE 2 taken substantially on the line 4—4 in FIGURE 3 showing the speed sense elements in the position thereof at governing speed in full lines and indicating the position of some of the elements thereof before governing action occurs in broken lines.

FIGURE 5 is a cross section of the mechanical speed sense illustrated in FIGURE 2 taken substantially on the line 5—5 in FIGURE 2.

FIGURE 6 is an enlarged partial section of the mechanical speed sense portion of the governing apparatus illustrated in FIGURE 1 taken substantially on the line 6—6 in FIGURE 3.

FIGURE 7 is a schematic diagram of the electric control circuit of the governing apparatus illustrated in FIGURE 1.

With particular reference to the figures one embodiment of the present invention will now be disclosed.

As shown in FIGURE 1 the speed control system of the invention comprises the vacuum throttle operating means 10 for positioning a throttle valve 12. The vacuum throttle operating means 10 is actuated by the electric control circuit 14 shown best in FIGURE 7. Portions of the electric control circuit 14 are energized by the mechanical speed sense 16 shown best in FIGURES 2-6.

The speed control system operates to limit the movement of the throttle valve 12 to that necessary to bring an automobile engine or other device with which the throttle valve 12 is associated to a governing speed when the solenoid 54 is not energized and to maintain the speed of the device between predetermined governing limits when the solenoid 54 is energized. The speed control system further operates to apply a light pressure to the accelerator pedal 34 on engine operation at or above a predetermined speed. In addition override mechanism 18 is provided so that should the operator of the automobile desire he may at any time override the governing apparatus and increase the speed of the automobile beyond the predetermined speed.

More specifically the vacuum throttle operating means 10 comprises first mechanism including the solenoid armature 20 secured to one end of the armature rod 24 and slidable within the cylinder 22 between the dotted and full line positions thereof shown in FIGURE 1 and the armature rod 24 is connected to throttle actuating linkage 26 through the override mechanism 18.

The throttle actuating linkage 26 includes the actuating rod 30 and lever 32 pivotally secured to the actuating rod 30 at one end. The other end of lever 32 is fixedly secured to the throttle 12. Linkage 26 is operable to pivot the throttle valve 12 into an open position on movement of the actuating rod 30 to the right in FIGURE 1. Actuating rod 30 may be moved to the right by moving the accelerator pedal 34 in a counterclockwise direction about pivot means 36 in opposition to the usual accelerator pedal bias spring 33.

Override mechanism 18 comprises the actuating lever 38 and accelerator lever 40 in conjunction with the override spring 50. The actuating lever 38 is directly connected to the armature rod 24 at one end and is rigidly secured to pivot means 144 for rotation therewith at the other end. Contact member 156 is mounted on pivot means 144 by the lost motion connection illustrated best in FIGURES 3, 4 and 6. Lever 40 is pivotally mounted on pivot means 144. As diagrammatically indicated in FIGURE 1 the contact member 156 is maintained against abutment 44 on the actuating lever 38 by the very light spring 160. The accelerator lever 40 is pivoted to the actuating rod 30 at one end and to the pivot means 144 at the other end. The accelerator lever 40 is provided with an abutment 46 thereon as shown best in FIGURE 1.

In operation the abutment 46 is urged into contact with the actuating lever 38 during governing of the automobile by the speed control system. When it is desired to override the speed control system and to move the actuating rod 30 to the right a distance greater than allowed by the positioning of the armature rod 24 by the vacuum throttle operating means 10, sufficient pressure is placed on the accelerator pedal 34 to overcome the bias of the spring 50 whereby the accelerator lever 40 is caused to move independently of the actuating lever 38 so that the throttle valve can be moved to any desired position.

Armature rod 24 reciprocates within the core 52 of the solenoid 54 secured within the reduced diameter portion 56 of the cylinder 22. The armature rod 24 is insulated from the solenoid 54 by the insulating sleeve 58 as shown. The solenoid 54 is energized through conductor 60, the flexibly mounted contact 61, armature 20, and armature rod 24 to ground on movement of the armature rod to the right in FIGURE 1 by means of the accelerator pedal 34 and actuating rod 30 to position the armature 20 in the dotted line position 20' in conjunction with movement to the left in FIGURE 1 of cylinder 22 by diaphragm 62. After the initial completing of the circuit through the solenoid 54 the armature is held in contact with the solenoid 54 by magnetic attraction to maintain electric engagement between armature 20 and contact 61 and thereby keep the solenoid 54 energized providing the switch 190 is closed indicating that speed control rather than just speed limiting is desired as will be considered more fully subsequently.

The diaphragm 62 is secured to the end 64 of cylinder 22 by convenient means, such as plate 66 and rivets 68. The outer periphery of diaphragm 62 is secured between the housing members 70 and 72 as shown. Housing member 70 is provided with an opening 74 therethrough in which the collar 76 is rigidly mounted to provide a guide for sliding axial movement of the cylinder 22. The housing part 70 is also provided with an opening 82 therethrough for maintaining the pressure between housing part 70 and diaphragm 62 at that of the surrounding atmosphere.

The cylinder 22 further includes an abutment 78 secured to the other end thereof. Spring 80 having one end abutting against the abutment 78 and the other end abutting against the collar 76 is provided to bias the cylinder 22 which is connected to the diaphragm 62 and guided in the collar 76 to the right, as shown in FIGURE 1.

The diaphragm 62, cylinder 22, plate 66, housing members 70 and 72, collar 76, spring 80 and abutment 78 comprise a flowable medium actuated second mechanism.

A pair of solenoid actuated valves 84 and 86 are secured to the housing portion 72. The valve 86 is provided to connect the chamber 88 formed between the diaphragm 62 and housing member 72 to a source of vacuum 90 when energized. The valve 84 is operable only when energized to connect the chamber 88 with the surrounding atmosphere. Solenoids 85 and 87 of valves 84 and 86 respectively are connected in the electric control circuit 14 so that both may not be energized at the same time.

Valves 84 and 86 are entirely similar and therefore only valve 86 will be considered in detail. The valve 86 includes an actuating solenoid 87 and the shaft 94 extending axially through and guided by the solenoid core 96. Spring 98 is provided to bias the shaft 94 and the disc 100 carried thereon toward the housing member 72. The valve head 102 is mounted on disc 100 for seating against the housing portion 72 over the metering orifice 104 therein.

Thus on coil 87 being energized the shaft 94 and disc 100 will move to the left as shown in FIGURE 1 whereby the valve head 102 will unseat to permit a vacuum to be drawn in chamber 88 by vacuum source 90. The valve 84 which is similar to the valve 86 is unenergized at this time so that the valve head 106 thereof has sealed the metering orifice 108.

Conversely if the solenoid valve 84 is energized the chamber 88 is open to the atmosphere and valve head 102 is seated against the housing member 72. When both valves are closed the chamber 88 is constructed to maintain the vacuum condition therein at the time of seating of the valve heads 102 and 106.

Thus in operation the position of the armature rod 24 is determined by the vacuum condition in the chamber 88 when the solenoid 54 has been energized and contact 61 engaged with armature 20 since the vacuum condition in chamber 88 determines the position of the cylinder 22 which moves in opposition to the spring 80 on a vacuum being drawn in the chamber 88.

The mechanical speed sensing means 16 which is shown only diagrammatically in FIGURE 1 is shown in detail in FIGURES 2–6 and includes the housing 110 having the base 112 and cap 114 which may be secured together by convenient means (not shown). A rotatable shaft 116 extends through the housing 110 and is supported in bushings 129 and 130 for rotation due to engagement with the squared ends of drive cables 115 and 117. Drive cables 115 and 117 are rotatably supported in bearings 118 and 120 in the sleeves formed by the annular flanges 122 and 124 respectively on the base 112 and cap 114 as shown. Bearing 126 carrying disc 127 is secured to bushing 130 mounted on shaft 116 as shown. A ball separator 132 having radially extending slots 134 therein in which the ball weights 136 move on rotation of shaft 116 is secured to shaft 116 for rotation therewith as shown best in FIGURES 2 and 5. The annular ball retaining cup 138 is sleeved over shaft 116 and retains the ball weights 136 within the radial slots 134.

In operation the shaft 116 is rotated at a speed proportional to the speed to be governed. For example, in an automobile the shaft 116 may be connected to rotate at the speed of the speedometer cable through cable 115 or cable 117 or if it is desired to govern engine speed cable 115 or 117 may be rotated by the engine. On rotation of the shaft 116 the balls 136 move radially outwardly in the slots 134 due to centrifugal force and force the cup 138 which is slidably mounted on the shaft 116 to move to the left, as shown in FIGURE 2, against the bias applied thereto by means of the spring 140 through lever 142. Thus the position of the lever 142 is a function of the speed of rotation of the shaft 116 and the resisting force applied thereto by the spring 140.

Lever 142, shown best in FIGURES 2, 3 and 4, is pivotally mounted on pivot pin 144. Lever 142 is provided with flanges 145 for stiffening and pivotal mounting thereof. Lever 142 has notch 146 in the end 148 thereof through which the shaft 116 extends. The flanges 145 are further provided with the rounded end portion 150 urged into engagement with the cup 138 by the spring 140. End 152 of lever 142 is provided with electric contacts 154 and 155 on opposite sides thereof.

A contact member 156 as shown best in FIGURES 3 and 4 is sleeved on the flat portion 158 of the pivot pin 144 and is secured to the pivot pin 144 for rotation therewith by means of the lost motion connection therebetween as shown in FIGURE 6. The contact member 156 is shaped as shown best in FIGURE 4, and has the leg portions 162 and 164 which are separated by web 165 rigidly secured to the hub 166 having opening 167 therein shaped as shown best in FIGURE 6 through which the pivot pin 144 extends.

Electrical contacts 168 and 170 are secured to the outer ends of the legs 162 and 164 of contact member 156 on opposite sides of the end 152 of lever 42. On pivoting of the lever 142 about the pivot pin 144 in a counterclockwise direction, as shown in FIGURE 4, the contact member 168 will engage the contact member 154 on one side of the lever 142 whereby an electrical circuit will be completed through the contact members. On pivoting of the lever 142 in a clockwise direction about the pivot pin 144 an electric circuit will similarly be completed through the contact members 170 and 155.

Spring 160 which is fixed to the pivot pin 144 at one end and to the contact member 156 at the other end is provided to urge the contact member into the position relative to the pin 144 shown in FIGURE 6. Substantial angular movement between the contact member and pin 144 due to counterclockwise movement of lever 142 is thus permitted by spring 160 on application of little force to lever 142 above that necessary to overcome the force of spring 140 with the contacts 168 and 154 in engagement since spring 160 is relatively weak. The lost motion connection illustrated in FIGURE 6 and spring 160 thus cooperate to prevent any substantial pressure from being applied to accelerator pedal 34 by lever 142 during operation of the governor as will become more evident when the over-all operation of the governor is considered.

Another purpose of spring 160 and the lost motion connection illustrated in FIGURE 6 is to provide an indication of operation of the automobile or other device with which the speed control of the invention is used at and above a predetermined speed. Thus in operation of the automobile without the switch 190 closed, lever 142 will be rotated clockwise as shown in FIGURE 2 as the speed of the vehicle approaches the predetermined governed speed against the bias of the prestressed spring 140. When lever 142 moves into contact with the contact member 156 through contacts 154 and 168 a mechanical force is exerted through lever 142, contact member 156, spring 160, lever 38, spring 50 and lever 40 to actuating rod 30 tending to move the accelerator pedal 34 in a throttle closing direction. The magnitude of this force is relatively low and is determined by the resiliency of spring 160. This force should be only sufficient to indicate to an operator of the accelerator pedal that the predetermined speed has been reached or exceeded.

The levers 38 and 40 are secured at one end thereof to the outer end 176 of pivot pin 144 as previously indicated. The lever 38 is connected at the other end to the armature rod 24, as shown best in FIGURES 3 and 4 to provide a feed back from the vacuum throttle operating means 10 in operation. The lever 40 is so connected to the actuating rod 30 at the other end thereof that closing the throttle 12 produces counterclockwise movement of the levers 40 and 38 as shown in FIGURE 4, and movement of contact 170 toward engagement with the contact 155. Similarly opening of the throttle 12 causes clockwise movement of the levers 38 and 40 in FIGURE 4 so that the contact 168 is moved toward engagement with contact 154.

As previously indicated the spring 140 is provided to bias the lever 142 into engagement with the cup 138 of the speed sense at all times. The end 180 of spring 140 thus bears against the end 152 of the lever 142 while the end 182 of the spring 140 bears against the adjustable abutment 84. Spring 140 is under initial compression so that the lever 142 will not begin to pivot about the pivot pin 144 until a speed closely approaching the governing speed is reached. At the governing speed the force applied to lever 142 by the spring 140 will exactly balance the force applied to the lever 142 by the cup 138 due to radially outwardly movement of the balls 136 on rotation of the shaft 116. The speed at which such balance will occur may be adjusted by moving the position of the abutment 184 by means of cable 185.

The electric control circuit 14 of the speed control system of the invention, best shown in FIGURE 7, will be considered in conjunction with the operation of the speed control system. In over-all operation it will be assumed that the speed control system is installed in a vehicle having a battery 186 and that the vehicle is in operation at a speed below the desired governing speed with the ignition switch 188 closed.

With the switch 190 opened as shown in FIGURE 7 the governor of the invention is operated as a speed limiting device. Thus as the accelerator pedal 34 is depressed to open the throttle valve 12 the armature rod 24 will be moved to the right, as shown in FIGURE 1, due to the clockwise movement of the levers 38 and 40 and the rightward movement of the actuating rod 30. Before clockwise movement of the levers 38 and 40 is initiated the contacts 155 and 170 on the lever 142 and the contact member 156 respectively are in engagement whereby solenoid 85 is energized to open the chamber 88 to the atmosphere through metering orifice 108 and port 109.

As the lever 38 is moved in a clockwise direction on depression of accelerator pedal 34 and as the governing speed is approached the contacts 155 and 170 are caused to separate whereby the metering orifice 108 is closed to seal the chamber 88. On further clockwise rotation of the member 38 or on the speed of the vehicle arriving at a speed at which governing is initiated, for example fifty-nine miles per hour, the lever 142 moves relative to the contact member 156 to cause engagement of the contacts 154 and 168. Engagement of contacts 154 and 168 cause the solenoid 87 to be energized whereby the chamber 88 is connected to the vacuum source 90 through the metering orifice 104.

On connection of the vacuum source 90 and the chamber 88 a vacuum is drawn in the chamber 88 to cause leftward movement of the cylinder 22, as shown in FIGURE 1, which will produce counterclockwise rotation of the levers 38 and 40 to close the throttle valve 12 whereby the speed of the vehicle controlled by the throttle valve 12 is limited. At the same time the counterclockwise movement of the lever 38 and the reduction in speed brought about by the closing of the throttle valve 12 will produce separation between the contacts 154 and 168 to deenergize the solenoid 87 whereby a vacuum condition sufficient to maintain the cylinder 22 in a position to limit the vehicle speed to approximately sixty miles per hour is maintained.

Should the vehicle speed tend to increase as for example when the vehicle passes over the top of a hill and starts on the down-grade, the lever 142 will be moved relative to the contact member 156 to close contacts 154 and 168 again and further reduce the speed of the vehicle in the manner just described. Should the speed of the vehicle be reduced due for example to heavy engine load as during travelling up a hill, the lever 142 will be caused to move relative to the contact member 156 so that contacts 170 and 155 will engage to exhaust at least a portion of the vacuum from the chamber 88 and permit clockwise movement of the accelerator pedal 34 to increase speed without the necessity of overriding the governor through the override mechanism. Thus it will be seen that the speed of a vehicle having the speed control system of the invention installed thereon may be limited to a speed below a predetermined speed.

When the vehicle operator desires to operate the vehicle at a controlled speed rather than at a limited speed only the manual switch 190, which may be conveniently located for operation by the vehicle operator, is actuated to complete an electric circuit from the battery 186 through a switch holding solenoid 192. The accelerator pedal 34 of the vehicle is then pivoted counterclockwise to open the throttle 12 and move the actuating rod 30 and armature rod 24 to the right in FIGURE 1 to cause armature 20 to move toward the dotted line position 20′ whereby engagement between armature 20 and flexible contact 61 of solenoid 54 will be effected on leftward movement of cylinder 22 as shown in FIGURE 1 under influence of vacuum drawn in chamber 88. The solenoid 54 is thus energized by the battery 186 through the normally closed brake switch 194, solenoid 54, armature 20 and armature rod 24 as the predetermined governed speed is approached. The armature 20 is thereafter held in contact with the solenoid 54 for movement with the cylinder 22 as previously indicated.

The lever 142 is at this time in a limiting clockwise postion as shown in FIGURE 2 since the vehicle has been travelling at a speed below the governing speed thereof and the spring 140 is under compression so that lever 142 will not begin to move in a counterclockwise direction about the pivot pin 144 until the speed of the automobile appoaches the governing speed. If, for instance, the governing speed of the vehicle is set at sixty miles per hour, the compression of the spring 140 may be set so that the lever 142 does not begin to move in a counterclockwise direction until the speed of the vehicle is fifty-nine miles per hous.

Thus until the speed of the vehicle is raised by the open throttle to fifty-nine miles per hour contacts 155 and 270 are engaged to energize the solenoid actuated valve 84, as shown in FIGURE 1, whereby the chamber 88 is opened to atmospheric pressure. At fifty-nine miles per hour the rotation of the shaft 116 produces movement of the cup 138 to pivot the lever 142 in a counterclockwise direction in opposition to the bias of the spring 140 so that the engagement between the contacts 155 and 170 is broken so that valve 106 closes opennig 108. The clockwise movement of the lever 142 will continue as the speed of the vehicle increases toward sixty miles per hour until the contacts 154 and 168 engage to energize the solenoid actuated valve 86 whereby a vacuum is produced in the chamber 88 by vacuum source 90.

The vacuum in chamber 88 will cause the cylinder 22 to move in a left direction in FIGURE 1, to energize the solenoid 54 and lock armature 20 and cylinder 22 together as previously indicated and to produce closing of the throttle 12. In regard to the latter, movement of the armature rod 24 in a leftward direction produces counterclockwise movement of the levers 38 and 40 causing counterclockwise movement of the contact member 156 and therefore disengagement of the contact members 154 and 168. Since both solenoid actuated valves 84 and 86 are unactuated at this time the vacuum condition in the chamber 88 will be maintained. The vehicle speed at this time will be between fifty-nine and sixty-one miles per hour or approximately sixty miles per hour at which speed the lever 142 is balanced by spring 140 and weights 136 through cup 138 with the contacts 154, 168, 155 and 170 all out of engagement.

Should the vehicle speed again increase beyond the governing speed the lever 142 will again move to engage the contacts 154 and 168 to draw vacuum in the chamber 88 and more fully close the throttle 12 in the manner previously indicated. Should the speed of the automobile decrease the lever 142 will move in a clockwise direction to engage the contacts 155 and 170 whereby the chamber 88 is open to the atmosphere through port 109 and the cylinder 22 is moved to the right in FIGURE 1 by the spring 80 to open the throttle.

Thus it will be seen that the speed of a vehicle having the speed control system of the invention installed therein may be maintained between very close limits, for example, between fifty-nine and sixty-one miles per hour if the governing speed is sixty miles per hour automatically on closing of the switch 190 and initial locking of armature 20 to cylinder 22 to provide positive speed control without the necessity of manually depressing the accelerator pedal 34.

Further, during an increase in speed with the armature rod 24 locked to cylinder 22 when the lever 142 is moved in a counterclockwise direction the lost motion connection between the pivot pin 144 and contact member 156 prevents lever 142 from applying force to accelerator pedal 34 through levers 38 and 40 and rod 30 other than that transmitted by the relatively weak spring 160. With the switch 190 opened the light force applied to accelerator pedal 34 by lever 142 through spring 160 provides an indication of operation of the vehicle at a speed at or above the predetermined governing speed.

Should the operator desire at any time, such as during passing of another automobile, to exceed the governed speed, it is only necessary to depress the accelerator by a force sufficient to overcome the compression of the spring 50 of the override mechanism previously considered to open the throttle as wide as desired.

Also, it will be noted that if it is desired to slow down during operation of the governor with switch 190 closed the brake switch 194 operates to deenergize the solenoid 54 whereby operation of the governor as a speed limiter may be continued until the accelerator pedal is again actuated to move the armature toward the dotted line position thereof and the cylinder 22 is moved to the right again to complete the circuit through the solenoid 54. The governor will then again operate as a speed control to maintain the speed of the vehicle between predetermined limits as indicated above.

The drawings and the foregoing specification constitute a description of the improved speed control system in such full, clear, concise and exact terms as to enable any person skilled in the art to practice the invention, the scope of which is indicated by the appended claims.

What I claim as my invention is:

1. A speed control system for use in controlling the speed of an automobile or similar device comprising a speed control member, an armature rod secured to the speed control member for movement therewith, pressure actuated diaphragm means including an electric solenoid operably associated with said armature rod for permitting unrestricted movement of the armature rod when the solenoid is unactuated and physically engageable with the armature rod when the solenoid is actuated for restricting movement of the armature rod in a speed control member opening direction, valve means positioned adjacent said diaphragm means operable on being energized to connect one side of the diaphragm means to a source of pressure for actuating the diaphragm means, and a speed responsive device operably associated with said valve means for energizing said valve means at a predetermined speed.

2. A speed control system for use in controlling the speed of an automobile or similar device comprising a speed control member, an armature rod secured to the speed control member for movement therewith, pressure actuated diaphragm means including an electric solenoid operably associated with said armature rod for permitting unrestricted movement of the armature rod when the solenoid is unactuated and physically engageable with the armature rod when the solenoid is actuated for restricting movement of the armature rod in a speed control member opening direction, valve means positioned adjacent said diaphragm means operable on being energized to connect one side of the diaphragm means to a source of pressure for actuating the diaphragm means, a speed responsive device operably associated with said valve means for energizing said valve means at a predetermined speed, and means operably associated with the speed responsive device for indicating when said device is operating above said predetermined speed.

3. A speed control system for use in controlling the speed of an automobile or similar device comprising a speed control member, an armature rod secured to the speed control member for movement therewith, pressure actuated diaphragm means including an electric solenoid operably associated with said armature rod for permitting unrestricted movement of the armature rod when the solenoid is unactuated and physically engageable with the armature rod when the solenoid is actuated for restricting movement of the armature rod in a speed control member opening direction, valve means positioned adjacent said diaphragm means operable on being energized to connect one side of the diaphragm means to a source of pressure for actuating the diaphragm means, a speed responsive device operably associated with said valve means for energizing said valve means at a predetermined speed, and means operably associated with the speed control member for permitting operation of the device at a speed above said predetermined speed.

4. A speed control system for use in controlling the speed of an automobile or similar device comprising a speed control member, an armature rod secured to the speed control member for movement therewith, pressure actuated diaphragm means including an electric solenoid operably associated with said armature rod for permitting unrestricted movement of the armature rod when the solenoid is unactuated and physically engageable with the armature rod when the solenoid is actuated for restricting movement of the armature rod in a speed control member opening direction, valve means positioned adjacent said diaphragm means operable on being energized to connect one side of the diaphragm means to a source of pressure for actuating the diaphragm means, a speed responsive device operably associated with said valve means for energizing said valve means at a predetermined speed, and means operable between the armature rod and diaphragm means for securing the armature rod to the diaphragm means for movement in opposite directions therewith to permit maintaining the speed of the device at said predetermined speed.

5. Structure as claimed in claim 4 wherein said device includes brake means and said speed control system further includes a brake switch operable in response to the brake means and means for releasing the armature rod from the diaphragm means on operation of the brake switch.

6. A speed control system for use in controlling the speed of an automobile or similar device comprising a speed control member, first mechanical means connected to the speed control member movable to position the speed control member to increase or decrease the speed of the device, vacuum actuated second mechanical means, first electric actuating means operable on energization to join the first and second mechanical means for movement together, electrically actuated valves associated with the second mechanical means, second electric actuating means operable on energization to actuate the valves to control the vacuum actuating the second mechanical means to produce movement of the joined mechanical means for regulating the speed control member between limits and maintaining the speed of the device substantially at a predetermined speed, and means responsive to the speed of the device to energize the second electric actuating means.

7. Structure as claimed in claim 6 wherein the second mechanical means comprises a diaphragm supported between two housing members, a cylinder one end of which extends through one of the housing members and is secured to the diaphragm whereby the cylinder is supported for axial translation on movement of the diaphragm, the chamber between the one housing member and diaphragm being open to atmospheric pressure, and means biasing the cylinder out of the one housing member.

8. Structure as claimed in claim 7 wherein the first mechanical means comprises an armature having an armature rod secured thereto reciprocally mounted in said cylinder and an actuating rod connected to the armature rod and to the speed control member to translate movement of the armature rod into movement of the speed control member.

9. Structure as claimed in claim 8 wherein said electrically actuated valves each comprise a shaft, a valve head on said shaft, a metering orifice in the other housing part, means biasing said valve head into seating engagement with the other housing part about said orifice, a solenoid surrounding said shaft operable on energization to move said shaft in opposition to said biasing means to unseat the valve head, and wherein said second electric actuating means comprises means for alternatively energizing the solenoid of different valves.

10. Structure as claimed in claim 9 wherein said means to energize the second electric actuating means comprises a source of electric energy connected to one end of each of the solenoids, a shaft rotatable at a speed proportional to the speed of the device, and a centrifugal switch for selectively completing a circuit through the solenoids in accordance with the speed of rotation of the rotatable shaft and the position of the speed control member.

11. A speed control system for use in controlling the speed of an automobile or similar device which device includes brake means comprising a speed control member a brake switch operable in response to actuation of the vehicle brake means, first mechanical means connected to the speed control member movable to position the speed control member to increase or decrease the speed of the device, vacuum actuated second mechanical means, first electric actuating means operable on energization to join the first and second mechanical means for movement together, electrically actuated valves associated with the second mechanical means, second electric actuating means operable on energization to actuate the valves to control vacuum actuating the second mechanical means to produce movement of the joined mechanical means for regulating the speed control member between limits and maintaining the speed of the device substantially at a predetermined speed, means responsive to the speed of the device to energize the second electric actuating means, and means for deenergizing said first electric actuating means on operation of said brake switch.

12. A speed control system for use in controlling the speed of an automobile or similar device comprising a speed control member, first mechanical means connected to the speed control member movable to position the speed control member to increase or decrease the speed of the device, vacuum actuated second mechanical means, first electric actuating means operable on energization to join the first and second mechanical means for movement together, electrically actuated valves associated with the second mechanical means, second electric actuating means operable on energization to actuate the valves to control vacuum actuating the second mechanical means to produce movement of the joined mechanical means for regulating the speed control member between limits and maintaining the speed of the device substantially at a predetermined speed, means responsive to the speed of the device to energize the second electric actuating means, and override means operably associated with the first mechanical means for permitting movement of the speed control member to a position for bringing the device to a speed above the predetermined speed at any time.

13. A speed control system for use in controlling the speed of an automobile or similar device comprising a speed control member, first mechanism connected to the speed control member movable to position the speed control member to vary the speed of the device, flowable medium actuated second mechanism, solenoid actuating means carried by the second mechanism operable on actuation to join the first and second mechanisms for movement together, second actuating means connected to the flowable medium actuated second mechanism operable on actuation to control the second mechanism to produce movement of the joined mechanisms for regulating the speed control member between limits and means responsive to the speed of the device to actuate the second actuating means.

14. A speed control system for use in controlling the speed of an automobile or similar device comprising a speed control member, first mechanical means connected to the speed control member movable to position the speed control member to increase or decrease the speed of the device, flowable medium actuated second mechanical means, first electric actuating means operable on energization to join the first and second mechanical means for movement togther, electrically actuated second actuating means operably associated with the second mechanical means for producing movement of the joined mechanical means to regulate the speed control member between limits to maintain the speed of the device substantially at a predetermined speed and means responsive to the speed of the device to energize the second actuating means.

15. Structure as set forth in claim 14 wherein the first actuating means includes a solenoid carried by and fixedly secured to one of the mechanical means and a corresponding armature member carried by and fixedly secured to the other of the mechanical means.

16. A speed control system for use in controlling the speed of an automobile or similar device comprising a speed control member, a first mechanical means connected to the speed control member movable to position the speed control member to increase or decrease the speed of the device including a pair of mechanical links, a lost motion connection between the links, one of said links being secured to the speed control member for movement therewith, a vehicle acceleration lever, a lost motion connection between the other of said links and the vehicle acceleration lever, pivot mounting means, a first lever connected to said other link pivotally mounted on said pivot mounting means, a second lever abutting said first lever and rigidly secured to said pivot mounting means, resilient means operable between said first and second levers and an armature rod pivotally connected to said second lever, vacuum actuated second mechanical means including a housing, a diaphragm secured in said housing forming therewith a vacuum chamber, a cylinder extending through said housing and secured to the diaphragm for movement therewith and resilient means operable between the housing and cylinder for urging the diaphragm member in one direction, first electric actuating means operable on energization to join the first and second mechanical means for movement together including a solenoid rigidly secured in and carried by the cylinder, the armature member rigidly secured to and carried by said armature rod reciprocally movable in said cylinder toward and away from said solenoid, a source of vacuum, a first electrically actuated valve positioned between the vacuum source and vacuum chamber operable on being energized to open the vacuum chamber to the vacuum source, a second electrically actuated valve operably associated with said vacuum chamber and operable on being energized to open the vacuum chamber to atmospheric pressure, second electric actuating means operable on energization to actuate the valves to control the vacuum actuating the second mechanical means to produce movement of the joined mechanical means for regulating the speed control member between limits and maintaining the speed of the device substantially at a predetermined speed, and means responsive to the speed of the device to energize the second electric actuating means including a U-shaped member having electrical contact members on the opposite ends thereof secured by means of a lost motion connection to said pivot mounting means, spring means urging the U-shaped member into engagement with said second lever, a third lever pivotally mounted centrally on said pivot mounting means and having a pair of contact members secured on opposite sides of one end thereof movable between the contact members on said U-shaped member, resilient means biasing said third lever in one direction, centrifugal means responsive to the speed of the device for moving said third lever in opposition to said resilient biasing means in accordance with the speed of the device and means for completing an electrical circuit through said electrically actuated valves on engagement of the contact members carried by said third lever with either of the contact members carried by said U-shaped member.

17. A speed control system for use in controlling the speed of an automobile or similar device comprising a speed control member, first mechanical means connected to the speed control member movable to position the speed control member to increase or decrease the speed of the device, vacuum actuated second mechanical means, first electric actuating means operable on energization to join the first and second mechanical means for movement together, electrically actuated valves associated with the second mechanical means, second electric actuating means operable on energization to actuate the valves to control the vacuum actuating the second mechanical means to produce movement of the joined mechanical means for regulating the speed control member between limits and maintain the speed of the device substantially at a predetermined speed, means responsive to the speed of the device to energize the second electric actuating means, and means operably associated with the speed responsive means for indicating when said device is operating above said predetermined speed.

18. A speed control system for use in controlling the speed of an automobile or similar device comprising a speed control member, first mechanical means connected to the speed control member movable to position the speed contol member to increase or decrease the speed of the device, second mechanical means, first electric actuating means operable on energization to join the first and second mechanical means for movement together, valves associated with the second mechanical means, second actuating means operable on energization to actuate the valves to control the second mechanical means to produce movement of the joined mechanical means for regulating the speed control member between limits and maintaining the speed of the device substantially at a predetermined speed, and means responsive to the speed of the device to energize the second actuating means.

19. A speed control system for use in controlling the speed of an automobile or similar device comprising a speed control member, first mechanical means connected to the speed control member movable to position the speed control member to increase or decrease the speed of the device, second mechanical means, first electric actuating means operable on energization to join the first and second mechanical means for movement together, valves associated with the second mechanical means, second electric actuating means operable on energization to actuate the valves to control the second mechanical means to produce movement of the joined mechanical means for regulating the speed control member between limits and maintain the speed of the device substantially at a predetermined speed, and means responsive to the speed of the device to energize the second electric actuating means.

References Cited by the Examiner

UNITED STATES PATENTS

| | | | |
|---|---|---|---|
| 2,021,832 | 11/1935 | Callihan | 180—82.1 X |
| 2,243,354 | 5/1941 | Musser | 180—82.1 X |
| 2,714,880 | 8/1955 | Riley | 180—82.1 |
| 2,916,100 | 12/1959 | Teetor | 180—82.1 |
| 2,966,224 | 12/1960 | Teetor | 180—82.1 |
| 3,023,828 | 3/1962 | Fuller et al. | 180—82.1 |
| 3,050,147 | 8/1962 | Teetor | 180—82.1 |
| 3,062,312 | 11/1962 | Dietrich et al. | 180—82.1 |

PHILIP ARNOLD, *Primary Examiner.*

A. HARRY LEVY, KENNETH H. BETTS, MILTON BUCHLER, *Examiners.*